C. F. JENKINS

March 28, 1933. SYNCHRONIZING SYSTEM Re. 18,783

3 Sheets-Sheet 1

Original Filed July 21, 1927

Witness:

Sybil A. Armond

Inventor

Charles Francis Jenkins

March 28, 1933. C. F. JENKINS SYNCHRONIZING SYSTEM Re. 18,783

Original Filed July 21, 1927 3 Sheets-Sheet 2

Witness:

Sybil R. Almond

Inventor

Charles Francis Jenkins

March 28, 1933.

C. F. JENKINS

SYNCHRONIZING SYSTEM

Re. 18,783

Original Filed July 21, 1927

3 Sheets-Sheet 3

Inventor

Charles Francis Jenkins

Witness:

Sybil L. Almond

Reissued Mar. 28, 1933 Re. 18,783

UNITED STATES PATENT OFFICE

CHARLES FRANCIS JENKINS, OF WASHINGTON, DISTRICT OF COLUMBIA, ASSIGNOR TO JENKINS LABORATORIES, INC., OF SILVER SPRING, MARYLAND, A CORPORATION OF THE DISTRICT OF COLUMBIA

SYNCHRONIZING SYSTEM

Original No. 1,766,644, dated June 24, 1930, Serial No. 207,515, filed July 21, 1927. Application for reissue filed March 22, 1932. Serial No. 600,549.

This invention relates to picture transmission systems, and in particular to arrangements for maintaining synchronous operation between the transmitting apparatus at the transmitting station and the receiving apparatus at the receiving station.

An object of my invention is to provide means for automatically maintaining a definite speed relationship between the transmitting and receiving apparatus.

Another object of my invention is to devise novel relay apparatus capable of responding to electric current variations of relatively high frequency.

My invention is illustrated in the accompanying drawings in which like reference characters represent like parts.

Figure 1:
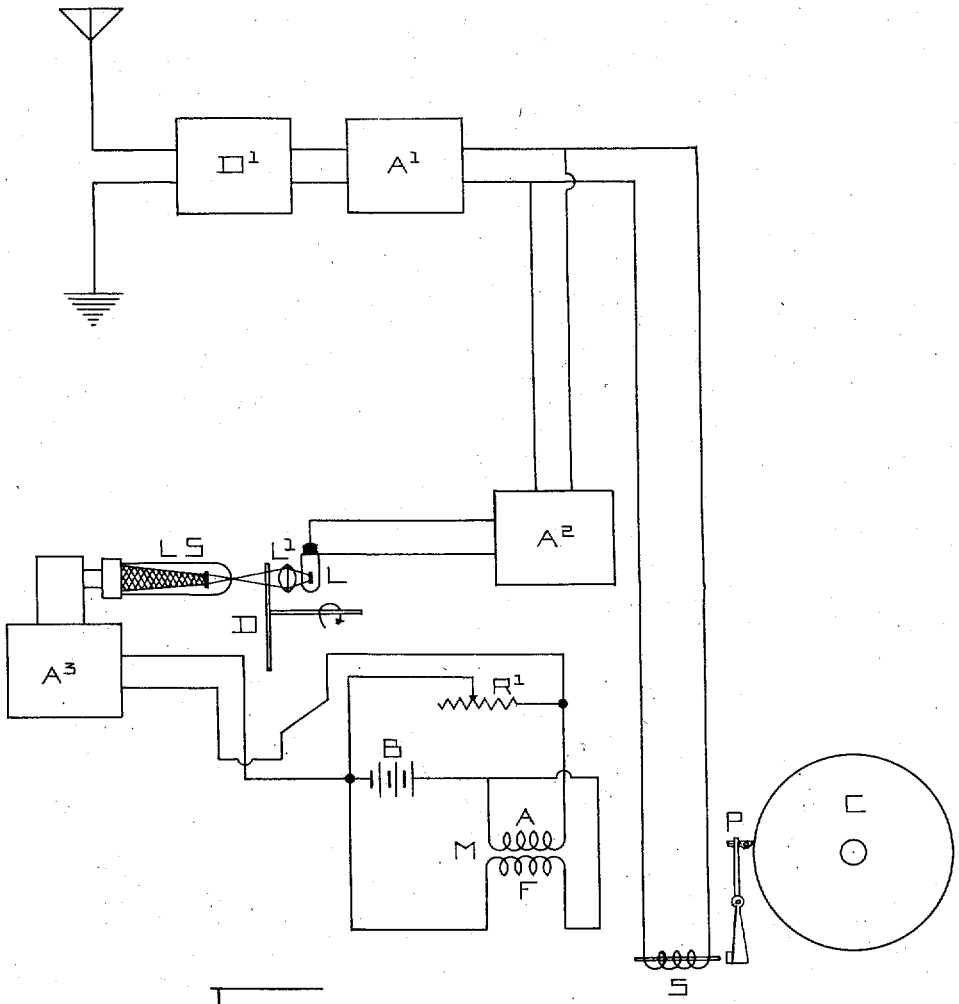
Figure 1 is a diagrammatic showing of one form of my invention employed at the receiving station.

In Figure 1, a motor M is arranged to drive a cylindrical drum C upon which is mounted the surface or film which is to receive the picture being transmitted. The motor M comprises an armature A and a field winding F, each of which is supplied with current from the battery B. The armature circuit of the motor is completed from battery B through the output circuit of amplifier A3, armature A, and back to battery B. The armature also has a shunt circuit from battery B through resistance R1.

The receiving station is provided with a radio receiving set comprising a detector D1 and an amplifier A1. Connected to the output circuit of amplifier A1 is a second amplifier A2, the output circuit of which contains an incandescent lamp L. The picture recording apparatus is also connected to the output circuit of amplifier A1 and comprises, for example, a solenoid S arranged to operate an inking pen P. A lens L1 is arranged to gather the divergent rays proceeding from lamp L and focus them upon a light-sensitive cell LS connected in the input circuit of amplifier A3. A disc D, provided with a series of holes arranged around its periphery, is mounted upon the shaft of motor A and is arranged to rotate in the path of the rays of light projected upon light-sensitive cell S by the lens L1. The width of the openings in disc D is preferably equal to half the distance between the openings, although this ratio may be varied considerably if desired.

The operation of Figure 1 is as follows:

It is to be understood that a radio wave is being transmitted from the transmitting station and that the wave is modulated in accordance with the light variations of successive elementary areas of the picture being transmitted and also in accordance with the speed of rotation of the transmitting apparatus. The synchronizing modulations bear a definite relation to the speed of the transmitting apparatus and may be produced in any desired manner, but I prefer to employ a light-chopper for this purpose, as disclosed in my United States Patent No. 1,694,065, granted to C. F. Jenkins, December 4, 1928. The modulated wave is received at the receiving station and detected by detector D1 to derive therefrom low frequency currents which represent both the picture light variations and the synchronizing impulses. This composite current is supplied to amplifier A1 where it is amplified and supplied to the output circuit. The amplified current is supplied to the recording apparatus which responds to the picture variations and causes the pen P to record upon the picture receiving surface, mounted upon drum C, ink marks corresponding to the dark portions of the picture being transmitted. The recording apparatus need not necessarily respond to the synchronizing interruptions or variations. A portion of the current in the output circuit of amplifier A1 is supplied to the input circuit of amplifier A2, and lamp L1 is caused to vary in intensity in accordance with the current variations. Accordingly, the beam of light falling upon the light-sensitive cell S will vary in intensity in accordance with the synchronizing variations. The beam of light is also subject to control by disc D in the following manner: In case the motor M is rotating at such speed that the holes in disc D rotate past the beam at a frequency equal to the frequency of the synchronizing variations, and the phase relation of the disc with respect to the synchronizing impulses is such that each pulse reaches a maximum as a hole in disc D is centered with respect to the beam of light, the effect of the beam of light upon the light-sensitive cell LS will be a maximum. It will thus be seen that light-sensitive cell LS will be intermittently illuminated at a frequency equal to that of the synchronizing variations. The light-sensitive cell will cause amplifier A3 to produce corresponding current variations in the armature circuit of motor M. In case disc D has such phase relation that a synchronizing pulse reaches its maximum when a solid portion of disc D is passing in front of the light ray, the effect of the ray upon light-sensitive cell LS will be a minimum, and the current variations produced in the armature circuit of motor M will be very small. For intermediate phase relations of the holes in disc D with respect to the synchronizing pulses, the effect of the light rays upon the light-sensitive cell will be to produce intermediate values of current variation in the armature circuit. The speed of motor M is adjusted by resistance R1 to such value that it is slightly below the desired synchronous speed. The effect of the current pulses produced by the light-sensitive cell LS in the armature circuit is to increase the motor speed. Accordingly, disc D will assume such phase relation with respect to the synchronizing pulses or variations of lamp L that the amplitude of the current pulses produced by LS is just sufficient to maintain the motor in synchronous operation with the incoming synchronizing pulses. In case the load upon the motor is increased for any reason, disc D will lag behind the synchronizing pulses by an amount sufficient to increase the amplitude of the current pulses produced by light-sensitive cell LS and to thereby supply to the armature A, increased current sufficient to accommodate the increased load. Conversely, if the load is decreased from its normal value, the motor will momentarily speed up and cause disc D to advance in phase relation with respect to the synchronizing variations, and the resulting current pulses produced by light-sensitive cell LS will be correspondingly reduced, and the motor will be prevented from getting out of synchronism.

Figure 2:
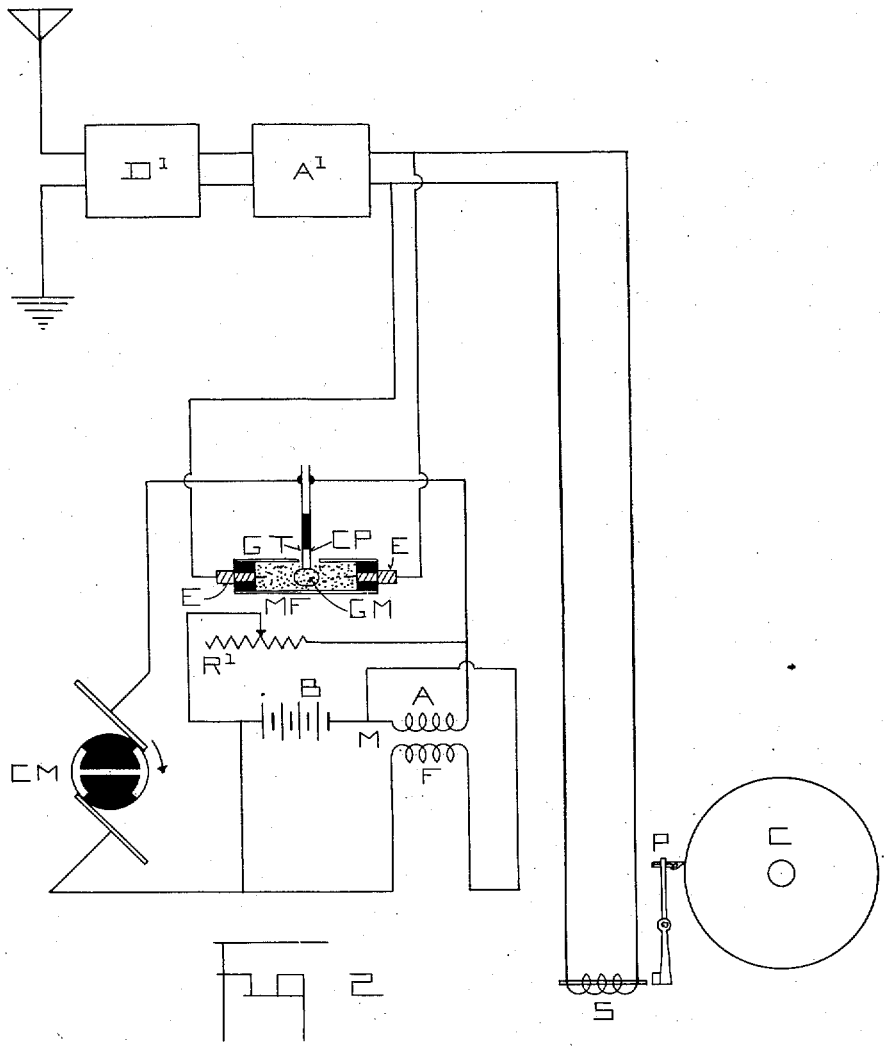
Figure 2 is a diagrammatic representation of a second form of apparatus employed at the receiving station.

The arrangement shown in Figure 2 is the same as that shown in Figure 1, except for the details of the motor control arrangement. In this figure, as in Figure 1, both the armature and the field of the motor are supplied with current from battery B. The armature circuit of the motor also includes an adjustable resistance R1. In a shunt path around resistance R1, a rotating commutator CM mounted upon the shaft of the motor is connected in series with contacts GT—CP of a special electric relay. The relay comprises a glass tube MF provided with an electrode E mounted in each end thereof. The tube is filled with an acidulated solution and also contains a globule of mercury GM immersed within the solution. The insulated contacts GT—CP are mounted upon the tube and extend into the solution and normally contact with the globule of mercury as shown in the figure. Electrodes E—E are connected to the output circuit of amplifier A1, and contact points GT—CP are connected in series with commutator CM in a shunt circuit around resistance R1 in the armature circuit.

The operation of Figure 2 is as follows:

The speed of motor M is adjusted by resistance R1 until it is slightly lower than the desired synchronous speed. With contacts GT—CP bridged by mercury GM, resistance R1 will be periodically short-circuited by commutator CM, twice for each revolution, and the time of short-circuit will depend upon the extent of the contact surface of the commutator and upon the speed of the motor.

When amplified low frequency current from amplifier A1 flows through the relay between electrodes E—E, the globule of mercury elongates and breaks the connection between contact points GT—CP. The connection between contacts GT—CP will, therefore, be broken synchronously with the synchronizing impulses.

It will thus be seen that the effectiveness of resistance R1 in the armature circuit is dependent upon the conjoint action of the commutator CM and the relay, and the time of short-circuit of resistance R1 is dependent upon the phase relationship existing between the commutator and the relay. If the commutator and the relay operate simultaneously to close their respective contacts, resistance R1 will be effectively cut out of the armature circuit for a maximum period. If the commutator and relay become displaced in phase in their operation the period of short-circuit will be reduced and resistance R1 will have greater effect in limiting the speed of motor M. Accordingly, with a given load upon the motor and with a given adjustment of the circuits, the motor M will automatically adjust commutator CM to such phase relation with respect to the relay operation that the effectiveness of resistance R1 in the armature circuit is just sufficient to maintain the motor at synchronous speed. If the load upon the motor is increased for any reason, the commutator CM tends to lag behind the operation of the relay and thereby increase the period of short-circuit of resistance R1, which will tend to increase the speed of the motor. Commutator CM will automatically assume such position that resistance R1 is effectively short-circuited for a period of time sufficient to increase the armature current by an amount necessary to compensate for the increased load. Conversely, if the load upon the motor is decreased, the commutator CM tends to advance in phase relation with respect to the operation of the relay and thereby decrease the period of short-circuit of resistance R1 which will offset the tendency of the motor to increase in speed above synchronous speed.

Figure 3:
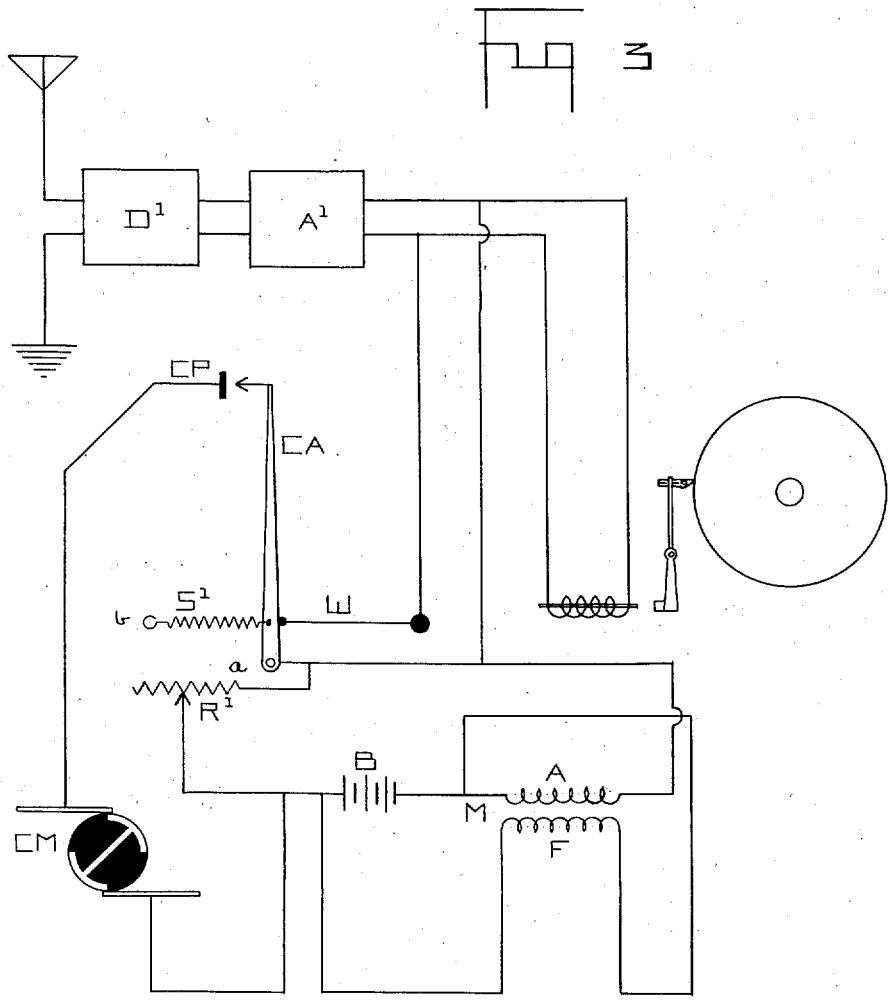
Figure 3 is a third modification of the invention.

The arrangement shown in Figure 3 is the same as that shown in Figure 2, except for the details of the relay. The relay shown in Figure 3 comprises a contact arm CA pivoted at a point (*a*). Cooperating with the contact arm is a stationary contact plate CP. The arm CA is normally held out of contact with plate CP by means of a wire W, one end of which is attached to the arm and the other end is anchored to a fixed terminal (*b*). A spring S1 is attached to the arm CA and tends to cause the arm to contact with plate CP. Wire W is connected to the output circuit of amplifier A1, and contact arm CA and plate CP are connected in series with commutator CM in a shunt path around resistance R1. Wire W is made of such material and such diameter that it is readily heated by current supplied from amplifier A1. The effect of the pulsating current flowing in wire W is to cause the wire to become elongated periodically and in synchronism with the synchronizing impulses. Spring S1 causes the arm CA to contact with plate CP each time wire W is elongated by the amplified current. Thus, the relay contacts will be closed periodically and in synchronism with the synchronizing signals. The action of the arrangement shown in Figure 3 will be readily understood from the foregoing explanation of the operation of Figure 2.

It is apparent that the arrangements shown in Figures 2 and 3 will also operate with only the relay connected in the shunt path around resistance R1, and the commutator CM connected in the armature circuit so as to periodically interrupt the total armature current.

While I have shown symbolically, and for the purpose of illustration only, a recording apparatus comprising an inking pen P operated by a magnet S, it will readily be understood that any other well known type of recording apparatus may be employed, such for example, as well known photographic recording apparatus.

The circuits of the relays have very little inductance and offer small impedance to high frequency currents.

It is to be noted that in Figure 1, I employ a form of electric relay having no moving mechanical parts, and the motor control system does not employ vibrating or sliding electric contact devices.

What I claim is—

1. In a synchronizing system the combination of means for producing synchronizing current variations, a motor to be synchronized, a source of current for operating said motor, means for translating said current into corresponding light variations, means to translate said light variations into current variations in the motor circuit, and means controlled by the motor to vary the effect of said light variations upon the current in the motor circuit.

2. In a synchronizing system the combination of means for producing synchronizing current variations, a motor to be synchronized, a source of current for operating said motor, means for translating said current into corresponding light variations, means to translate said light variations into current variations in the motor circuit, means controlled in accordance with the speed of the motor for varying the effect of said light variations upon the current in the motor circuit.

3. In a synchronizing system the combination of means for producing synchronizing current variations, a motor to be synchronized, a source of current for operating said motor, means for translating said current into corresponding light variations, means to translate said light variations into current variations in the motor circuit, means for controlling the effect of said light variations in accordance with the relative phase displacement between the angular rotation of the motor and the synchronizing variations.

4. The method of synchronizing the operation of a motor which consists in continuously transmitting from a sending station synchronizing current impulses, translating the said impulses into corresponding light variations, controlling the current supplied to the motor in accordance with the light variations, and varying the effect of the light variations in accordance with the speed of the motor.

5. The method of synchronizing the operation of a motor which consists in continuously transmitting from a sending station synchronizing current impulses, translating the said impulses into corresponding light variations, controlling the current supplied to the motor in accordance with the light variations, and varying the effect of the light variations in accordance with the relative phase displacement between the angular rotation of the motor and the synchronizing impulses.

6. In a synchronizing system the combination of means for producing synchronizing current variations, a motor to be synchronized, a source of current for operating said motor, an incandescent lamp controlled by the synchronizing current, a light-sensitive cell controlled by light from said lamp and connected to supply current variations to said motor circuit, and a light-interrupting disc driven by the motor and arranged between the lamp and light cell.

7. An electric relay system comprising means for translating current variations into corresponding light variations, means for translating said light variations into current variations, and means controlled by said current variations for controlling the action of the light upon the light translating means.

8. In a synchronizing system the combination of means for producing synchronizing current variations, a motor to be synchronized, a periodic circuit interrupter operated by said motor, a second circuit interrupter having an operating circuit of substantially no inductance connected to the source of synchronizing current, and circuit connections whereby the operation of the motor is controlled by the conjoint action of said interrupters.

9. The method of limiting the phase displacement of a local motor such as used in radiographic receiving apparatus and which is to run within given limits of phase and synchronism with respect to a distant motor, which consists in producing a great plurality of successive high-frequency signals each of a duration which is a function of the speed of the distant motor and of a strength which varies in accordance with an area of an image to be transmitted, applying said signals to control the speed of the local motor, and varying the strength of each signal to affect the speed of the local motor in accordance with simultaneous phase difference existing between the motors.

10. The method of limiting the phase displacement, at a local station, of a local motor such as used in radiographic receiving apparatus and which is to run closely in synchronism with respect to a distant motor at a distant station; which consists in producing at the distant station a great plurality of successive high-frequency signals in determinate order and of a duration which is a function of the speed of the distant motor; and at the local motor station receiving said signals, photoelectrically varying the strength of said signals substantially in accordance with the simultaneous phase differences existing between the motors; and continuously and at high-frequency applying said varied signals to control the speed of the local motor.

11. The method of synchronizing radiographic apparatus, which comprises producing at the transmitting station a continuous series of electrical signals of predetermined duration, in determinate order and of a strength variable in accordance with areas of an image to be transmitted; and, at a receiving station, varying an electric current in consonance with said signals and in proportion to simultaneous phase displacements existing between the apparatus in the two stations; and applying the varied current for synchronizing.

12. The method of limiting the phase displacement of a local motor such as used in radiographic receiving apparatus and which is to run within given limits of phase and synchronism with respect to a distant motor, which consists in producing a great plurality of successive high-frequency signals, each of a duration which is a function of the speed of the distant motor and of the shade characteristics of a visual representation to be transmitted, varying the instantaneous strength of the signals responsive to simultaneous phase difference of the motors, and applying energy controlled by the varied signals to affect the speed of the local motor.

In testimony whereof I have hereunto set my hand on this 18 day of March, 1932.

CHARLES FRANCIS JENKINS.